United States Patent [19]

Mercier

[11] Patent Number: 5,391,294
[45] Date of Patent: Feb. 21, 1995

[54] PARTICLE SEPARATOR DEVICE WITH CIRCULATION OF FLUID, WITH DOUBLE EFFECT OF EXTRACTION

[75] Inventor: Dominique Mercier, Meudon-la-Foret, France

[73] Assignee: Codiex (S.N.C.), Velizy Cedex, France

[21] Appl. No.: 122,574

[22] PCT Filed: Mar. 27, 1992

[86] PCT No.: PCT/FR92/00281
§ 371 Date: Sep. 21, 1993
§ 102(e) Date: Sep. 21, 1993

[87] PCT Pub. No.: WO92/17278
PCT Pub. Date: Oct. 15, 1992

[30] Foreign Application Priority Data

Mar. 28, 1991 [FR] France .................... 91 03813

[51] Int. Cl.6 .................... C02F 3/06; B01D 43/00
[52] U.S. Cl. .................... 210/151; 210/195.3; 210/202; 210/512.1; 210/618
[58] Field of Search .................... 210/150, 151, 195.1, 210/195.3, 202, 259, 512.1, 616, 618, 788; 55/459.1

[56] References Cited

U.S. PATENT DOCUMENTS

| | | | |
|---|---|---|---|
| 2,179,919 | 11/1939 | Carr et al. | 210/512.1 |
| 2,564,963 | 8/1951 | Drigenko et al. | 210/512.1 |
| 2,672,215 | 3/1954 | Schmid | 210/512.1 |
| 2,768,745 | 10/1956 | Albertson | 210/512.1 |
| 3,213,879 | 10/1965 | Thompson | 210/512.1 |
| 3,232,436 | 2/1966 | Saint-Jacques | 210/512.1 |
| 3,802,570 | 4/1974 | Dehne | 210/512.1 |
| 4,147,630 | 4/1979 | Laval, Jr. | 210/512.1 |
| 4,168,228 | 9/1979 | Mallatt et al. | 210/616 |
| 4,675,112 | 6/1987 | Verde | 210/616 |
| 4,681,685 | 7/1987 | Sutton et al. | 210/618 |
| 5,116,488 | 5/1992 | Torregrossa | 210/512.1 |

FOREIGN PATENT DOCUMENTS

| | | |
|---|---|---|
| 2205369 | 5/1974 | France . |
| 345311 | 12/1921 | Germany . |
| .587474 | 11/1933 | Germany . |
| 861494 | 1/1953 | Germany . |
| 967474 | 11/1957 | Germany . |
| 1289516 | 2/1969 | Germany . |
| 960342 | 6/1964 | United Kingdom . |

Primary Examiner—Christopher Upton
Attorney, Agent, or Firm—Young & Thompson

[57] ABSTRACT

A device for separating particles from a liquid to be treated is disclosed. The device has a cylindrical enclosure with an inlet for creating a swirling flow at its upper end and an annular channel formed by a flow diverter plate leading to a retention chamber at its base. The flow diverter generates an ascending swirling flow of treated liquid which is discharged through an axial outlet tube in the uppermost portion of the enclosure. The flow diverter includes at least one plane central section and means for adjusting its longitudinal position to adjust the annular channel. The axial outlet tube is extended downwardly by a flow adjusting element to create a flow of annular section.

20 Claims, 4 Drawing Sheets

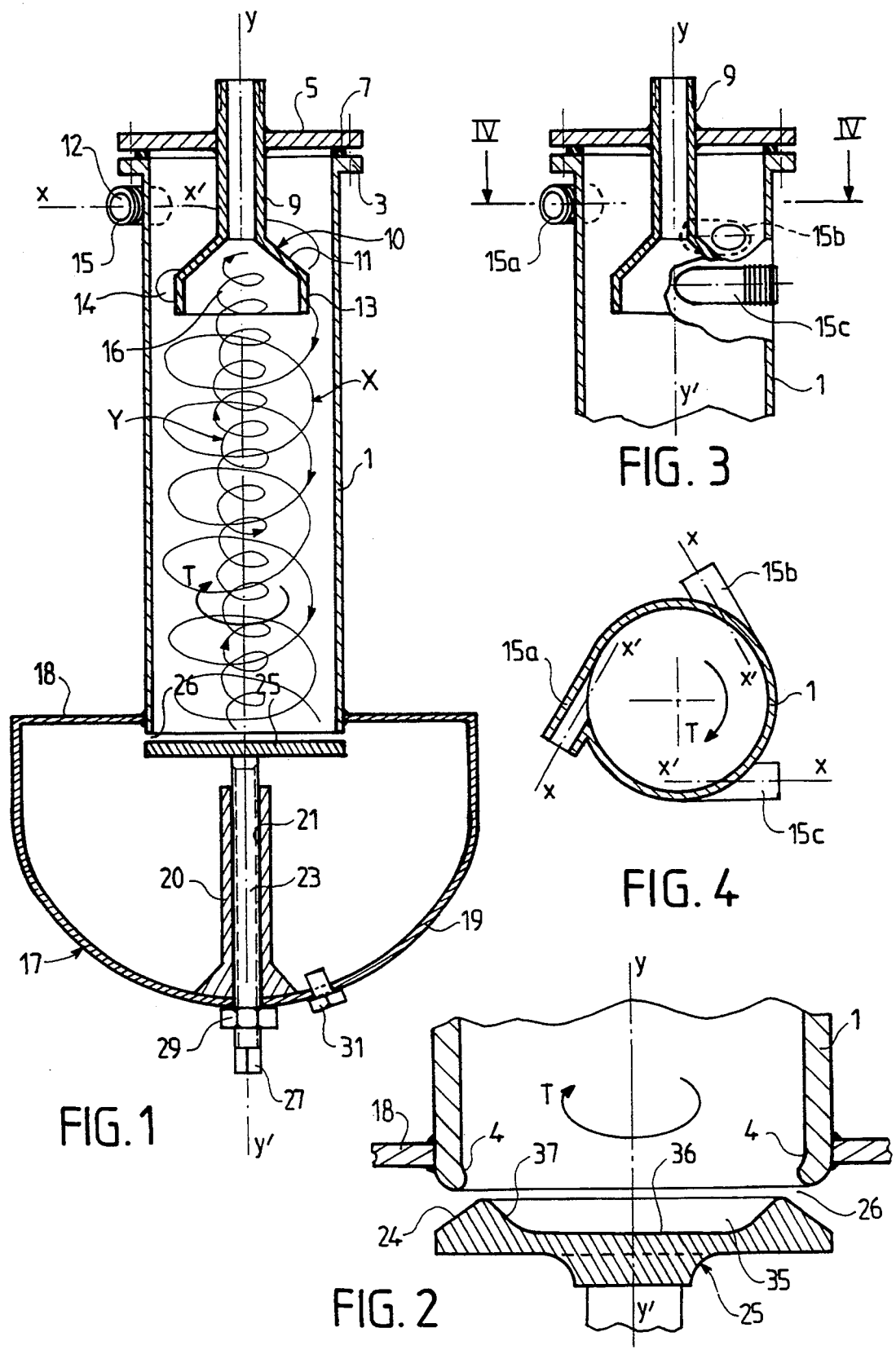

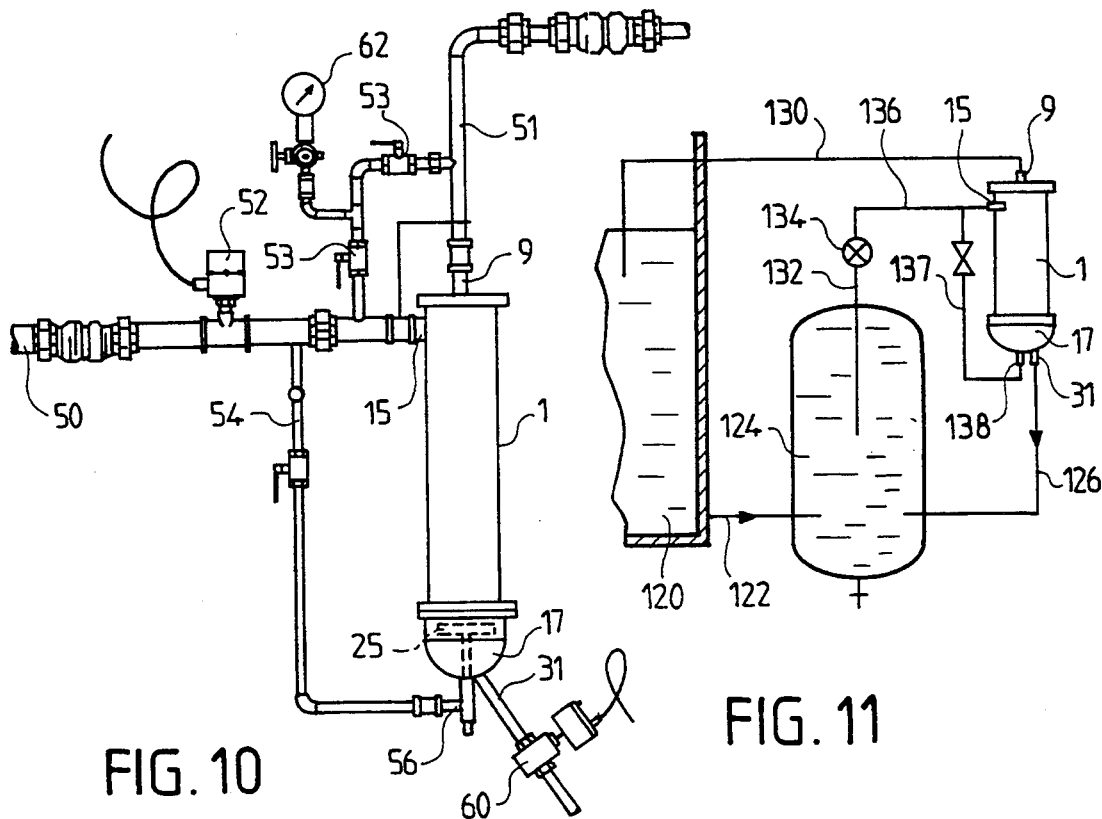
FIG. 10
FIG. 11
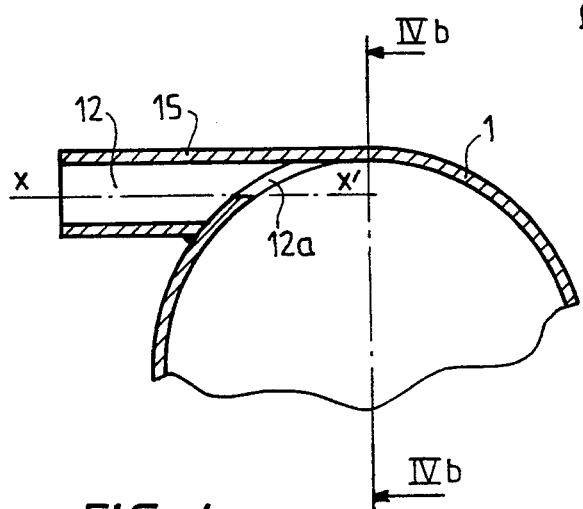
FIG. 4a
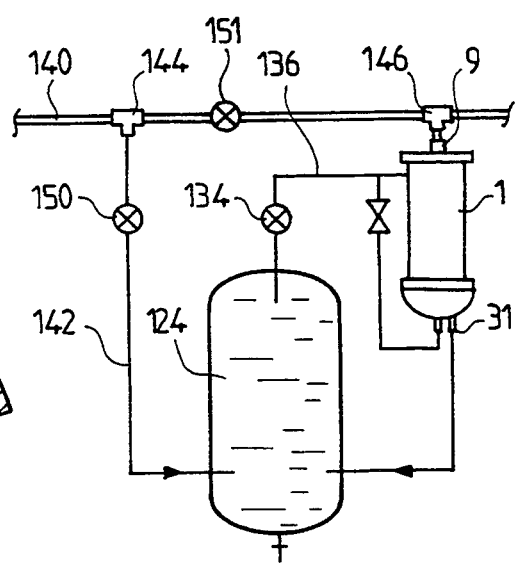
FIG. 13

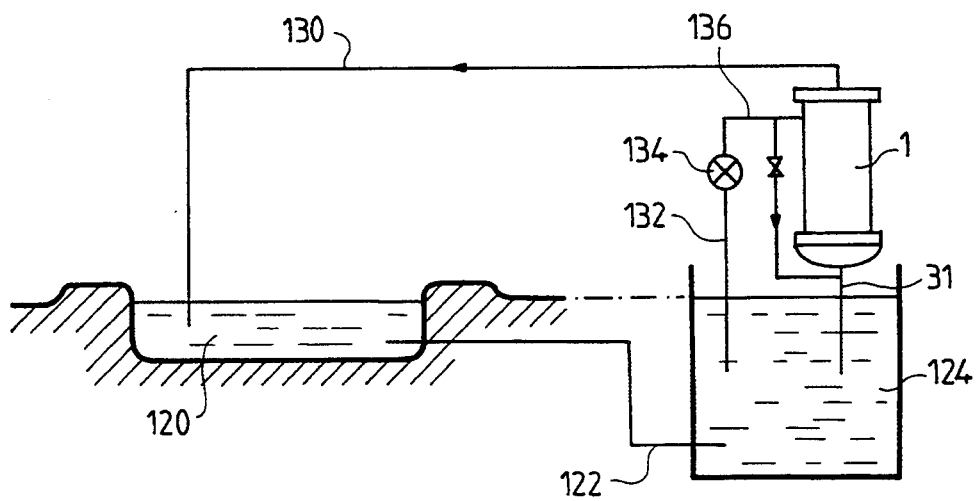
FIG. 12
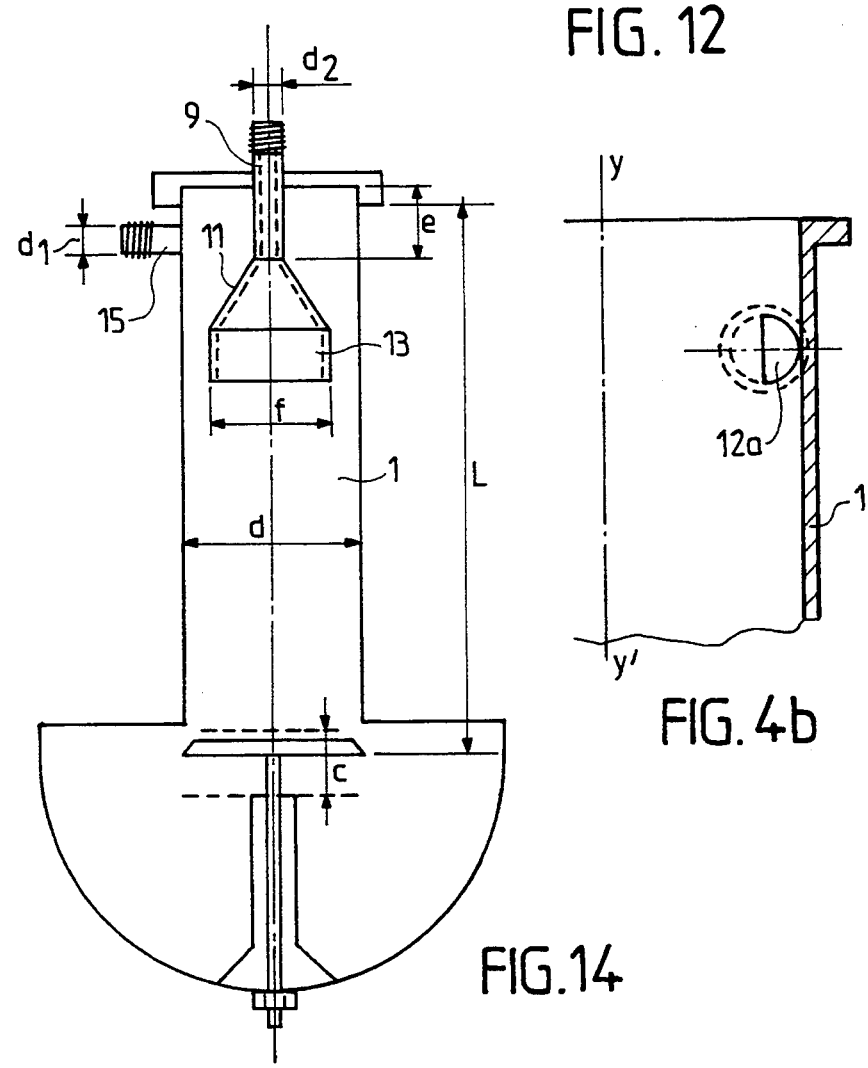
FIG. 4b
FIG. 14

PARTICLE SEPARATOR DEVICE WITH CIRCULATION OF FLUID, WITH DOUBLE EFFECT OF EXTRACTION

The present invention relates to a particle separator device with fluid circulation, with double effect of extraction, and more particularly to a device intended for separating from a liquid particles in suspension therein. The present invention also relates to a process and a device for purifying a liquid to be treated biologically, employing such a particle separator.

Different types of separators are known which, for the majority, subject a fluid to be treated to an eddying movement of "vortex" type, in an enclosure of generally truncated shape, in which the particles are entrained by the fluid in movement towards the apex of the frustum of cone located at the base of the apparatus, in order then to be received in a retention chamber. Patent FR-A-2 205 369 describes such a separator in which the fluid in movement located on the outer periphery of the vortex is entrained in the retention tank.

Although the separator devices of this type ensure separation by centrifugation of the largest particles to bring them to the periphery of the eddy, their extraction, i.e. their separation from a liquid medium, is effected only partially, since the eddying movement of the liquid continues in the retention chamber, which prevents them from precipitating easily in the bottom thereof. Such devices are therefore not efficient.

The present invention has for its object to propose a particle separator which makes it possible to extract the solid particles brought to the periphery of the eddy and to cause them then to be deposited in a retention chamber, whilst avoiding mixing the liquid treated with the slurries constituting the residues of the prior treatment of the liquid.

The present invention also has for its object a separator making it possible to create, at the centre of a descending principal eddying movement, an ascending secondary eddying movement which ensures a second centrifugal separation of solid particles remaining in suspension in the liquid after the first separation, this second separation being followed by an extraction which is ensured by the principal eddying movement.

The present invention also has for its object to propose means for facilitating the formation of the ascending secondary eddy.

The present invention thus has for an object a device for separating particles contained in a liquid to be treated, comprising a cylindrical enclosure, closed at its upper end, this latter being provided with means for injecting the liquid to be treated, oriented tangentially with respect to the inner wall of the enclosure, so as to create therein a descending forced eddying flow, said enclosure comprising, at its base, an annular channel delimited by the lower face of the cylindrical enclosure and a central deflector core intended to ensure evacuation of the particles contained in the fluid to be treated, and a retention chamber, adapted to collect said particles, the deflector core generating an ascending central eddying flow of treated fluid, an axial outlet tube being provided in the upper part of the enclosure to ensure evacuation of the axial column of treated fluid from the enclosure, characterized in that the deflector core is constituted by a deflector plate comprising at least one plane central part, this plate comprising means for adjusting its longitudinal position, making it possible to modify and adjust the value of the section of passage of said annular channel, and in that the axial outlet tube is extended downwardly by a flux regulating element constituted, from upstream to downstream, by a downwardly widening truncated part, extended by a cylindrical part with an outer diameter less than the inner diameter of the cylindrical enclosure so as to create therebetween a flux regulating flow stream of annular section.

In an embodiment of the invention, the quality of the flow of the principal eddy is improved by giving the annular space included between the inner wall of the cylindrical enclosure and the outer wall of the flux regulating element, a width substantially equal to one third of the inner radius of the cylindrical enclosure.

Applicants have also ascertained that the stability of the flows obtained was further improved when the section of passage of the means for injecting the liquid to be treated was equal to that of said annular space.

Furthermore, Applicants have established that, contrary to the devices of the prior state of the art, it was possible to prevent circulation of the fluid inside the retention chamber by using a deflector plate with a diameter greater than the inner diameter of the cylindrical enclosure, this deflector plate being disposed beneath the lower end of the cylindrical enclosure, so that the vertical component of the fluid in movement is deviated by the deflector, which prevents any circulation of fluid inside the retention chamber. On the contrary, the particles, due to their mass, are driven outwardly by the centrifugal force, so that they penetrate in the retention chamber and are then deposited therein.

In another variant embodiment of the invention, the injection means are constituted by a tube whose axis is perpendicular to the direction of the generatrices of the cylindrical enclosure and which is fixed thereon, for example by welding. In order to render the trajectory of the fluid more tangential, only that half of the surface of the wall thereof corresponding to the orifice of the injection tube is pierced, namely the half located between the vertical axis of symmetry of said orifice and the outer wall of the enclosure.

In a variant of the invention, the deflector element is constituted by a circular plate pierced with a series of channels causing its lower face to communicate with its upper face, the projections of the axes of these channels on the deflector plate, at the outlet of said channels, are oriented tangentially, i.e. perpendicularly to each radius issuing from the centre of the plate and terminating at the centre of the outlet orifice, these channels being directed, when going from the inside towards the outside, in the same direction as the injection channel, so as to increase the eddying flow produced and the formation of the central secondary eddying flow. On the other hand, the axes of these channels form with the upper surface of the deflector plate a small angle of incidence, preferably less than 30°. The inlets of these channels are connected by a pipe to an outside pressurized fluid supply, preferably with the same fluid as the one to be treated. The present embodiment makes it possible to aid the start of the central eddying flow when, for example, the fluid to be treated is injected under a pressure so low that it would have been insufficient to allow the establishment of said flow by itself. Once the latter is established, it is possible, in certain cases, to eliminate the supply of fluid of the deflector plate, which, consequently, is no longer necessary for maintaining the eddy.

In another variant of the invention, the upper face of the deflector plate is hollowed out with a dish, with flat bottom, of which the inner edges are preferably rounded so that its shape is continuous with the lower inner edge of the enclosure. The flat bottom will preferably have a diameter at least equal to the inner diameter of the base of the flux regulating element. The base of the inner part of the enclosure may also advantageously be rounded, by incurving it towards the inside, so as to improve its continuity of shape with the inner edge of the dish hollowed out in the deflector plate, by making the same rounding allowing the base of the eddy to be guided towards the central part of the dish without undergoing braking, and thus aid the formation of the central eddying flow necessary for the second operation of separation and for the evacuation of the treated fluid.

It is also known that the biological purification of waters may be effected by processes of bio-increase which consist in enriching a polluted medium with the aid of specific micro-organisms, intended to destroy the pollution. In order to develop, it is known that such micro-organisms need to be fixed, for example in inorganic supports. Such supports laden with their micro-organisms go to the bottom of the reserve of water to be treated, whence the micro-organisms, developing in the porous cavities of the supports, escape progressively to degrade the surrounding pollution. Now, on the one hand, such micro-organisms are usually damaged by light and, on the other hand, their efficiency is reduced when they are made to act in water subjected to turbulences or forced circulations for example with the aid of pumps. At the present time, such a system of biological purification may consequently be used with difficulty in order to maintain in a state of non-pollution watertight basins of small depth, such as those for example of public fountains.

The present invention therefore has for an object to provide a process and a device for employing the particle separation device according to the invention to ensure purification of a liquid biologically with a view to ensuring, in particular, the maintenance of basins of the type mentioned above, by the enrichment of the polluted medium with the aid of specific micro-organisms fixed on a support.

The present invention therefore also has for an object a process for purifying a liquid by biological means, characterized in that it consists in supplying liquid to be purified to a contact vat, or biological reactor, containing micro-organisms fixed on a support, in drawing this liquid from the contact vat and injecting it under pressure in a particle separator device, in separating therein the particles and the supports of micro-organisms contained in the liquid, in collecting them in a retention chamber, in reinjecting them in the contact vat, and in extracting the treated and purified liquid from the separator.

The present invention also has for an object a device for ensuring purification of a liquid by biological means of the type employing micro-organisms fixed on a support, characterized in that it comprises a contact vat, or biological reactor, containing said micro-organisms, into which opens out a pipe for admission of the liquid to be treated and/or purified, this contact vat comprising an outlet pipe and injection means adapted to pulsate, inside a particle separator device, the liquid to be treated and/or purified drawn from the contact vat, the retention chamber of said particle separator device comprising means for sending in the contact vat the particles and the supports containing the micro-organisms, separated from the liquid in the course of functioning of the separator device.

In a particularly interesting embodiment of the separator according to the invention, the latter ensures separation of supports of micro-organisms contained in a liquid to inject them in a vat, or "reactor" where they effect reactions of decomposition, the excess micro-organisms being mixed with the treated water and the latter being evacuated towards a basin or a circuit of water, the micro-organisms continuing to effect their action of depollution.

Forms of embodiment of the present invention will be described hereinafter by way of non-limiting examples, with reference to the accompanying drawings, in which:

FIG. 1 is a view in vertical and longitudinal section of a separator device representing a first embodiment of the invention.

FIG. 2 is a partial view in vertical and longitudinal section, on a larger scale, of a variant embodiment of the device of FIG. 1.

FIG. 3 is a partial view in vertical and longitudinal section of the upper part of a separator device according to the invention.

FIG. 4 is a view in transverse section along line IV—IV of FIG. 3.

FIG. 4a is a partial view in transverse section, on a larger scale, of a variant of the embodiment shown in FIG. 4.

FIG. 4b is a partial view in section, on a larger scale, of the device of FIG. 4a, along line IVb—IVb thereof.

FIG. 10 is a view in elevation showing an application of the particle separator device according to the invention.

FIGS. 11 to 13 are schematic views illustrating three variant embodiments of a process and a device for treating water by biological means, according to the invention.

FIG. 14 is a diagram showing the preferred respective proportions of the different elements constituting the particle separator device according to the invention.

Figure 5:
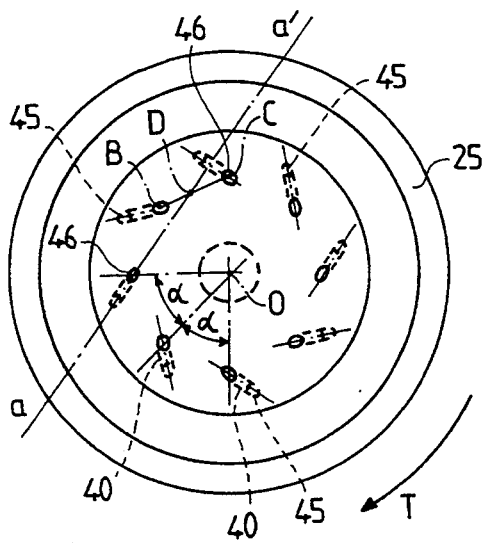
FIG. 5 is a plan view, on a larger scale, of the deflector plate used in the embodiment shown in FIG. 9.
Figure 6:
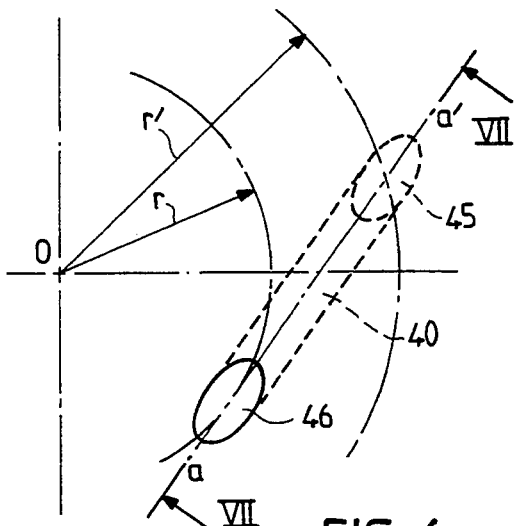
FIG. 6 is a partial plan view, on a larger scale, of the deflector plate shown in FIG. 5.

In FIG. 1, the particle separator device according to the invention comprises an enclosure 1, constituted by a cylindrical metal tube, of longitudinal axis yy', usually vertical but which may also be inclined if necessary, this enclosure being open at its lower end and comprising at its upper end an annular flange 3. This latter receives a cover 5 constituted by a circular plate fixed on the flange 3, for example by a series of bolts (not shown in the drawings), with the interposition of an O-ring 7. The cover 5 is traversed by a coaxial tube 9, fixed for example by welding thereon and of which the base terminates in a flux regulator element 10 constituted by a truncated part 11 of small thickness widening downwardly, which is followed by a cylindrical part 13, of smaller diameter than that of the inner wall of the enclosure 1, so as to form therebetween an annular passage 14. The upper part of the enclosure 1 receives an injection conduit 15 which is fixed thereon by welding, and of which the inner passage 12 opens out in enclosure 1. The axis xx' of this conduit 15 is disposed transversely with respect to the longitudinal axis yy' of the enclosure 1 and tangentially with respect to the inner surface thereof. The outer part of this conduit presents connection means, such as for example a threading, enabling it to be connected to a source of fluid to be treated.

A retention chamber 17, constituted by a semi-spherical reservoir 19, is joined to the base of the enclosure 1 by a horizontal plane ceiling 18. The bottom of the retention chamber 17 receives, on its inner face, a cylindrical support 20, of longitudinal axis yy', whose base is widened in order to allow correct fixation on the retention chamber 17. The support 30 is pierced with a threaded axial hole 21, traversing the base of the retention chamber 17. This hole 21 receives a screw 23 of which the upper end is fast with a circular deflector plate 25, perpendicular to the longitudinal axis yy' and whose diameter is close to the outer diameter of the enclosure 1, so that it is in a position to obturate the lower orifice thereof completely. The lower end of the screw 23 projects beneath the retention chamber 17 and comprises a control square 27 intended for driving it in rotation. It is thus possible, by screwing the screw 23 more or less, to position longitudinally, i.e. along axis yy' of the enclosure 1, the deflector plate 25 with respect to the base of the enclosure 1 so as to adjust the section of passage of the annular space 26 existing between the upper face of the deflector plate 25 and the lower edge of the enclosure 1. A counter-nut 29 disposed on the screw 23 ensures immobilization of the deflector plate 25 with respect to the retention chamber 17 and therefore with respect to the base of the enclosure 1, in a predetermined given position.

Of course, the deflector plate 25 may also present a truncated edge 24 (FIG. 2), widening downwardly, and which is inclined with respect to the longitudinal axis yy' by about 45°, so as to improve the shape of said annular passage 26 and promote passage of the particles extracted from the fluid to be treated. The bottom of the retention chamber 17 comprises draining means 31, intended for extracting the slurries which accumulate during operation of the device, these draining means being constituted, for example, by a simple screwed stopper.

Functioning of the apparatus according to the invention is particularly interesting in that it enables a double-effect centrifugal separation to be effected.

Thus, by reason of the tangential orientation of the injection conduit 15, the fluid penetrating in the enclosure 1 undergoes, in known manner, a rotating movement which is channeled by the truncated part 11 of the flux regulator element 10, then by the cylindrical part 13 thereof to form a descending forced eddying flow X which undergoes a deflection on the deflector plate 25 and then forms an axial ascending eddying column Y, directed in counterflow within the descending eddying flow X, and which engages in the inner cavity 16 of the flux regulator element 10 to be expelled outside the apparatus via tube 9. The solid particles contained in the injected liquid to be treated are separated therefrom by the centrifugal force of the forced eddying movement and, when they arrive opposite the annular space 26, they are extracted therefrom and ejected into the retention chamber 17 where they will be be deposited. It will be noted that such deposit is rendered possible by the fact that the liquid in movement in the enclosure 1 is not entrained in the retention chamber 17 because there is no communication, in the vertical sense, between the enclosure 1 and said chamber 17. There is therefore a de facto separation between the liquid in the course of treatment in the enclosure 1 and the slurries which are formed in the retention chamber 17, which is particularly interesting from the standpoint of hygiene.

After deflection of the liquid in movement on the deflector 25, the central ascending eddying column Y exerts on the fine particles remaining in suspension in the liquid, a centrifugal action, so well that they are entrained in the outer column X which thus extracts them and entrains them in its own movement to eliminate them via the annular orifice 26.

The apparatus according to the invention thus presents a particularly noteworthy yield thanks to this double centrifugal separation.

In order to promote deflection of the fluid to the base of the device, and as shown in FIG. 2, the upper face of the deflector plate 25 has a central dish 35 hollowed out therein, whose bottom 36 is plane and inner edge 37 inclined from bottom to top and from inside to outside with respect to the longitudinal axis yy'. The base of the inner wall of the enclosure 1 preferably forms a rounding 4, whose concavity is oriented towards the interior thereof, this rounding 4 being joined substantially with the inner edge 37 of the dish 35. The annular edge 24 of the plate 25 is inclined by about 45° with respect to the longitudinal axis yy' of the device and the space formed between it and the base of the enclosure 1 forms the annular flow passage 26.

The fact, according to the invention, of being able to adjust the section of passage 26 offered to the particles advancing towards the retention chamber 17, and of being able to modify the longitudinal position of the base of the central eddy Y formed, makes it possible to broaden the operational domain of the particle separator device according to the invention and to use, for example, the same apparatus with fluids and particles of very different physical parameters. In any case, the device according to the invention may be adapted by the user, by simply adjusting the longitudinal position of its deflector plate 25, to the multiple operational conditions encountered, for it to furnish an optimum result.

The device according to the invention also makes it possible, in the course of its launching, to effect a given positioning of the deflector plate 25 particularly favourable to the establishment of the forced eddying movement, then, after the formation of the latter, to effect a fresh positioning more favourable to the desired conditions of separation. The different positionings of the deflector plate 25 may, of course, be controlled by automatized means.

In order, in particular, to favour, at launching, the formation of the eddy and the establishment of the ascending axial eddying movement Y of the treated fluid, a plurality of injection conduits may be employed in order to combine the tangential efforts applied to the fluid to be treated.

In the variant embodiment shown in FIGS. 3 and 4, three injection conduits 15a, 15b and 15c respectively are used, disposed angularly at 120° with respect to one another, and whose axes xx' are disposed tangentially with respect to the inner surface of the tube 1. The injection conduits are disposed on three cross sections, located one below the other, and the injection conduits 15a, 15b and 15c are thus successively encountered from top to bottom.

In the variant embodiment shown in FIG. 4a, the enclosure 1 comprises an injection conduit 15 for the liquid to be treated which is disposed so that one of its generatrices is tangential to a cross section of the enclosure 1. The inner channel 12 of this injection conduit 15 is in communication with the interior of the enclosure 1 via an orifice 12a which is pierced in the wall thereof. As shown in FIGS. 4a and 4b, only that half of the surface of the enclosure located facing the inner channel 12 is pierced. This arrangement makes it possible to priviledge the streams of liquid tangential to the inner wall of the enclosure 1, which improves the formation of the forced eddying movement.

Figure 7:
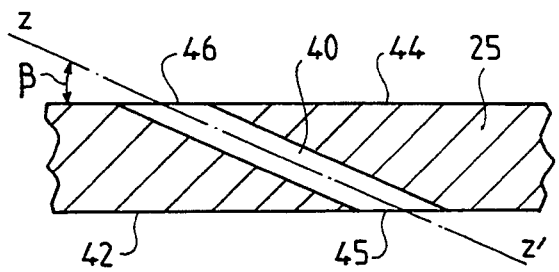
FIG. 7 is a partial view in vertical section along line VII—VII of FIG. 6.

In an interesting variant of the invention, the plate is traversed by a series of channels, supplied with liquid under pressure, which are oriented tangentially with respect to the plate so as to create jets of fluid aiding the formation of the ascending central eddying movement Y. As in FIGS. 5 to 9, the deflector plate 25 is traversed by a series of a plurality of channels 40, for example eight in number, starting from the periphery of the lower face 42 of the deflector plate 25, where they form inlet orifices 45, opening out on the upper face 44 thereof, via outlet orifices 46. The outlet orifices 46 are distributed regularly over a circle centred at centre O of the plate 25 and of radius r, so that an angle at the centre $\alpha$ separating two respective outlet orifices 46 is equal to 45°. These channels 40 are oriented so that their axis of symmetry zz' forms, as shown in FIG. 7, an angle $\beta$ with the upper surface 44 of the deflector plate 25, preferably less than 30°. Moreover, as shown in FIG. 5, the orthogonal projection aa' of an axis of symmetry zz' of a channel 40, at the outlet of an orifice 46, passes through the middle D of a segment BC joining the centres B and C of two following respective outlet orifices (going in the direction T of the ascending eddy Y). In fact, Applicants have established that this orientation of the channels 40 at the outlet of the plate 25 allowed an optimum entrainment of the ascending inner eddying movement Y.

Figure 8:
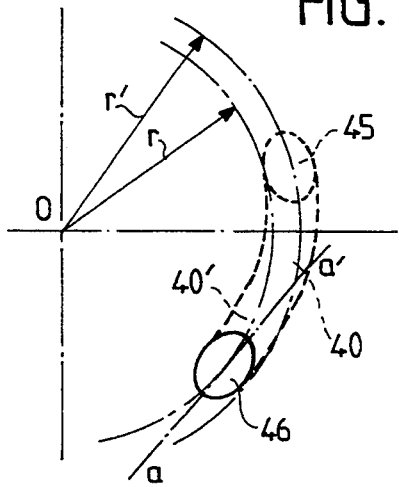
FIG. 8 is a partial plan view of a variant embodiment of the deflector plate shown in FIG. 6.

Of course, as shown in FIG. 8, the channels 40 may be of different number and of curved shape so as to reduce the radius r' of the circle on which are distributed the inlet orifices 45 of these channels 40. However, in this embodiment and as before, the channels 40 preferably present, at the outlet, a rectilinear part 40' of which the projection aa' of the axis of symmetry zz' on the upper face 44 of the deflector plate 25 presents the same geometrical properties as described in the preceding embodiment.

Figure 9:
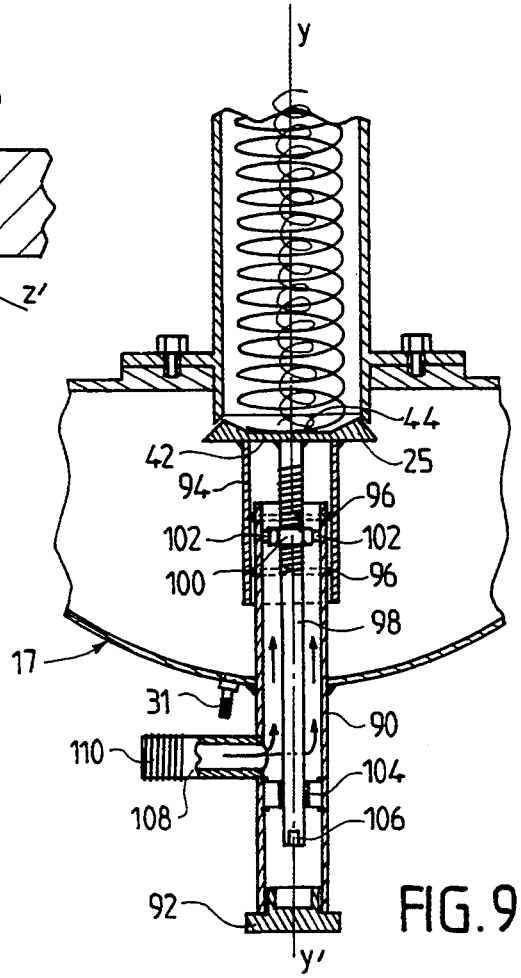
FIG. 9 is a partial view, in vertical and longitudinal section, of a variant of the separator device according to the invention.

FIG. 9 shows a device ensuring both a supply of fluid of the deflector plate 25 and the longitudinal displacement thereof, so that this displacement may be effected, during operation, without creating leakages of fluid outside the device. To that end, the bottom of the retention chamber 17 is traversed by a tube 90 of axis yy', fixed for example on the latter by welding, of which the lower end is closed by an obturator stopper 92. The lower face 42 of the deflector plate 25 receives, likewise by welding, a tube 94 of axis yy', whose inner diameter is greater than the outer diameter of the tube 90, so as to allow an axial slide of these two tubes in one another, the inner volume of the tube 94 being in communication with the inlet orifice 45 of the channels 40, two O-rings 96 being disposed in peripheral grooves provided in one of these two tubes so as to ensure therebetween a fluid-seal. An axial screw 98 is fixed, by welding, on the lower face 42 of the deflector plate 25 and is screwed in a threaded nut 100, maintained by flanges 102 on the inner wall of the tube 90, so as to allow free circulation of the fluid between the inner wall thereof and the nut 100. The tube 90 comprises a pressurized fluid supply constituted by a tube 108 comprising means 110 allowing its connection to a supply of pressurized liquid. Sealing means 104 are provided between the tube 90 and the screw 98, downstream of the pressurized fluid supply means 108. The lower part of the screw 98 terminates in a control square 106.

Thus, after having removed the obturator stopper 92, rotation of the screw 98 may be controlled by acting on the square 106. Under this action, the screw 98 is screwed or unscrewed in the nut 100, which brings about the longitudinal displacement of the deflector plate 25 and of the tube 94 fast therewith, which moves on the outer surface of the tube 90, conserving the tightness with respect to the outside of these tubes.

The particle separator device according to the invention may be interposed, as shown in FIG. 10, in a water distribution network. To that end, the conduit 15 of the separator device for injecting the water to be treated is connected to a water admission pipe 50, with the interposition of a control electro-valve 52, and the outlet tube 9 for the treated water is connected to a pipe 51 ensuring continuity of the water distribution network. A branch conduit 54 connects the downstream of the electro-valve 52 to the water supply means for the deflector plate 25. A differential pressure gauge 62 indicates the difference in pressure existing between the water to be treated arriving via pipe 50 and the treated water leaving via pipe 51, so as to allow adjustment of the intensity of the eddying movement as a function of the nature of the fluid to be treated and of the particles contained therein, for example by acting on a control valve 53. An electro-valve 60 ensures evacuation of the slurries which accumulate in the bottom of the retention chamber 17 in the course of operation of the device.

Applicants have established that, particularly in the domain of water treatment, an optimum efficiency of the particle separator device was obtained when well determined proportions of its different constituent elements were respected. By way of example, the proportions are indicated in the Table hereinbelow, as a function of the inner diameter d of the enclosure 1, and with reference to the diagram of FIG. 14.

| | |
|---|---|
| Length of enclosure 1 | M = 5d |
| Diameter of injection conduit 15 | d1 = d/4 |
| Diameter of outlet tube 9 | d2 = d/4 |
| Distance from the small base of the frustum of cone 11 of the flow regulator element to the upper part of the enclosure 1 | e = d/2 |
| Diameter of the cylindrical part 13 of the flux regulator element 10 | f = d − 20 mm |
| Longitudinal stroke of the deflector plate 25 | c = 30 mm |

The device according to the invention may also be used for effecting purification of the water by biological means, particularly when a process of bio-fixation is employed, consisting in placing into contact with the water to be treated micro-organisms previously fixed on supports, for example inorganic ones, these micro-organisms developing in the porous cavities in said supports and escaping progressively to destroy the surrounding pollution.

Thus, in the embodiment shown in FIG. 11, it is proposed to ensure purification, by biological means, of the water contained in a basin 120. To that end, the bottom thereof is connected, via a pipe 122, to the bottom of a "reactor" vat, or contact vat 124, containing micro-organisms, of nature appropriate to the type of treatment to be effected, fixed on supports, for example inorganic ones, the bottom of this same vat 124 also being connected, by means of a pipe 126, to the purging orifice 31 of a retention chamber 17 of a particle separator according to the invention. The outlet tube 9 of this particle separator is connected, by a pipe 130, to the upper part of the basin 120 in which it is desired to maintain a state of non-pollution. A draw-off tube 132 is immersed in the contact vat 124, via the upper part thereof, to extract the water therefrom by means of a pump 134, possibly controlled by timing means, and to inject it, via a pipe 136, in the injection conduit 15 of the particle separator. In a variant embodiment, a branch conduit 137 connects the pipe 136 to water supply means 138 for the deflector plate 25.

Thus, upon start-up of the pump 134, the latter injects in the particle separator, via pipe 136, a quantity of water to be treated containing micro-organisms fixed on supports, as well, possibly, as other particles, and the eddy produced in the separator makes it possible to collect, in the retention chamber 17, at the base thereof, both the particles contained in the water and the supports containing the micro-organisms, which are then returned by the pipe 126 into the contact vat 124. In this latter, the micro-organisms have every possibility to act efficiently, since they are, on the one hand, sheltered from the light and, on the other hand, sheltered from the violent currents provoked by the pumps. The treated water, laden with the excess micro-organisms, is returned, via the outlet tube 9 of the separator and the pipe 130, in the basin 120. Thus, the present process and device for treating, by biological means, the water contained for example in a basin, allow an optimum action of the micro-organisms used, where the devices of the prior art proved totally inefficient.

As shown in FIG. 12, a contact vat 124 may also be used, open to the free air in its upper part, the level of the latter then being ensured with a basin 120 which it is desired to maintain in a state of non-pollution by the simple principle of communicating vessels. Of course, levelling by other means may be used, such as level measuring devices connected to pump or electro-valve systems.

Of course, the process and device for purification by biological means according to the invention are not limited to uses in the domain of tanks, basins or other types of storage means.

As shown in FIG. 13, the present invention may also be employed to ensure purification of a water distribution network. To that end, there is disposed, in a branch conduit on a conduit 140 of a water distribution network, a contact vat 124 whose base is connected, by a pipe 142, to an upstream water intake 144 with the interposition of a control valve 150. The downstream part of the water intake 144 is connected, with the interposition of a control valve 151, to the outlet of the tube 9 of a particle separator, by a water intake 145 in order then to continue towards the water network. The contact vat 124 is connected to the particle separator device in the same manner as in the embodiments shown in FIGS. 11 and 12. The present embodiment of the invention functions in manner identical to that described hereinbefore and ensures a treatment, both physical and biological, of a given percentage of the flowrate flowing in the pipe 140, which percentage may be varied by means of flowrate control valves 150 and 151.

Finally, the means for supplying the deflector plate 25 with fluid to be treated may be used for introducing into the enclosure 1 any treatment products which, by reason of the mixing resulting therein from the formation of the eddying flows, will be mixed particularly efficiently with the liquid to be treated.

I claim:

1. Device for separating particles contained in a liquid to be treated, comprising a cylindrical enclosure (1), closed at its upper end, a single means (15) for injecting the liquid to be treated at the upper end, oriented tangentially with respect to the inner wall of the enclosure (1), so as to create therein a forced eddying flow, said enclosure (1) comprising, at its base, a radially outwardly opening annular channel (26) delimited by the inner face of the cylindrical enclosure and a central deflector core to ensure evacuation of the particles contained in the fluid to be treated, and a retention chamber (17) to collect said particles, the deflector core generating an ascending central eddying flow of treated fluid, an axial outlet tube (9) in the upper part of the enclosure (1) to ensure evacuation of the ascending central eddying flow of treated fluid from the enclosure (1), the deflector core comprising a deflector plate having a diameter at least equal to the inner diameter of the base of said enclosure (25) spaced below the lower end of said enclosure and comprising at least one flat central part, means for adjusting the longitudinal position of said plate, making it possible to modify and adjust the width of said annular channel (26), the axial outlet tube being extended downwardly by a flux regulating element (10) constituted, from upstream to downstream, by a downwardly widening truncated part, extended by a cylindrical part with an outer diameter less than the inner diameter of the cylindrical enclosure (1) so as to create therebetween a flux regulating flow stream (14) of annular section.

2. Device according to claim 1, wherein the width of the annular space included between the inner wall of the cylindrical enclosure (1) and the outer wall of the cylindrical part (13) of the flux regulating element (10) is about one third of the inner radius of the cylindrical enclosure (1).

3. Device according to claim 1, wherein the apex of the truncated part (11) of the flux regulating element (10) is located substantially at the level, in the longitudinal direction (yy'), of the part most downstream of the outlet orifice of the injection means (15).

4. Device according to claim 1, wherein the sections of passage of the injection means (15) and of the flow stream (14) of annular section are identical.

5. Device according to claim 1, wherein the injection means are constituted by a tubular element (15) fast with the cylindrical enclosure (1), of which the inner conduit (12) opens out in the enclosure via an orifice (12a), located in line with a half of inner conduit (12) included between the axis of symmetry of said conduit and the outermost part thereof.

6. Device according to claim 1, wherein the deflector plate (25) is of circular shape and its upper face has a circular dish (35) with flat bottom (36) hollowed out therein, of which the inner peripheral edge (37) is inclined from bottom to top and from the inside towards the outside.

7. Device according to claim 4, wherein the lower inner face (4) of the enclosure (1) is incurved inwardly of the latter so that its shape is substantially continuous with the inner peripheral edge (37) of the dish (35) of the deflector plate (25).

8. Device according to claim 1, wherein the deflector plate (25) presents an outer annular part (24) inclined from top to bottom and from the inside towards the outside of the deflector plate (25) and which is disposed beneath the lower end of the cylindrical enclosure (1), defining between it and said lower end of the enclosure (1) said annular flow channel (26).

9. Device according to claim 1, wherein the deflector plate (25) is traversed by at least one channel (40) comprising an inlet orifice (45) opening on its lower face (42) and an outlet orifice (46) opening out on its upper face, the inlet orifice (45) being supplied with fluid under pressure.

10. Device according to claim 9, wherein the supply of pressurized fluid to the deflector plate (25) is connected to the means (15) for injecting the fluid to be treated.

11. Device according to claim 9, wherein the deflector plate (25) comprises at least three channels (40), of which the axis of symmetry (zz'), at the outlet of the plate (25), forms with the upper face (44) of the latter an angle ($\beta$) equal at the most to 30°.

12. Device according to claim 11, wherein the inlet (45) and outlet (46) orifices of the channels (40) are regularly distributed angularly on circles of respective radii (r') and (r) centered at the center (O) of the deflector plate (25), and the projection (aa') of the axis of symmetry (zz') of each channel (40) on the deflector plate (25) passes through the middle (D) of a segment (BC) joining the respective centers (B, C) of the following two outlet orifices (46), when one moves in the direction of rotation (T) of the eddy.

13. Device according to claim 9, wherein the lower part of the retention chamber (17) is traversed, in fluid-tight manner, by an axial tube (90), and the lower face (42) of the deflector plate (25) comprises a tube (94) whose inner volume is in communication with the inlet orifice (45) of said channel (40), whose inner diameter is greater than the outer diameter of the tube (90), so as to allow an axial sliding of these two tubes with respect to each other, sealing means (96) ensuring, together, a fluid-tightness, an axial screw (98) is fixed to the lower face (42) of the deflector plate (25) and is screwed in a threaded element (100) fast with the inner wall of the tube (90), allowing free circulation of the fluid on either side thereof, this device comprising means (102) for supplying pressurized fluid inside the tube (90), sealing means (104) being provided between the tube (90) and the screw (98), downstream of the pressurized fluid supply means (108), and the lower end of the screw (98) comprises means (106) for driving the screw (98) in rotation.

14. Device according to claim 9, wherein said orifice (40) comprises means for supplying at least one treatment product to be mixed with the fluid.

15. Device according to claim 1, wherein the length L of the enclosure (1) is equal to about five times its inner diameter (d), the diameter (d1) of the injection conduit (15) is about one quarter of the inner diameter (d) of the enclosure (1), the diameter (d2) of the outlet tube (9) is equal to one quarter of the inner diameter (d) of the enclosure (1), the distance between the small base of the frustum of cone (11) of the flux regulator element (10) and the upper part of the enclosure (1) is equal to half the inner diameter (d) of the latter, the diameter (f) of the cylindrical part (13) downwardly extending the frustum of cone (11) is equal to the inner diameter of the enclosure less twenty millimeters and the longitudinal stroke (c) of the deflector plate (25) is equal to thirty millimeters.

16. In combination with a particle separator device as claimed in claim 1, a device to ensure purification of a liquid by biological means, employing micro-organisms fixed on a support, comprising a contact vat (124) containing said micro-organisms, in which opens out a pipe (122, 142) for admission of the liquid to be treated, this contact vat (124) comprising an outlet pipe (136) and injection means (134) that pulsates inside said particle separator device, the liquid to be treated drawn from the contact vat (124), the retention chamber (17) of said particle separator device comprising means for sending into the contact vat (124) the particles and supports containing the micro-organisms separated from the liquid in the course of functioning of the separator device.

17. Device according to claim 16, wherein the contact vat (124) is constituted by a tank of which the upper part is open to the free air.

18. Device according to claim 17, wherein the pipe (142) for admission of the liquid to be treated is connected, by a branch conduit (144), to a distribution pipe (140) and the outlet tube (9) of the particle separator-via which the treated liquid is extracted, is connected by a second branch conduit (146) to the same distribution pipe (140) disposed downstream of the first.

19. Device according to claim 1, wherein said enclosure (1) is cylindrical from top to bottom thereof.

20. Device according to claim 1, wherein said plate (25) is disposed in said retention chamber (17).

* * * * *